April 13, 1954   M. H. NIELSEN   2,674,924
DIE MECHANISM
Filed Oct. 6, 1949   2 Sheets-Sheet 1
Fig. 1.
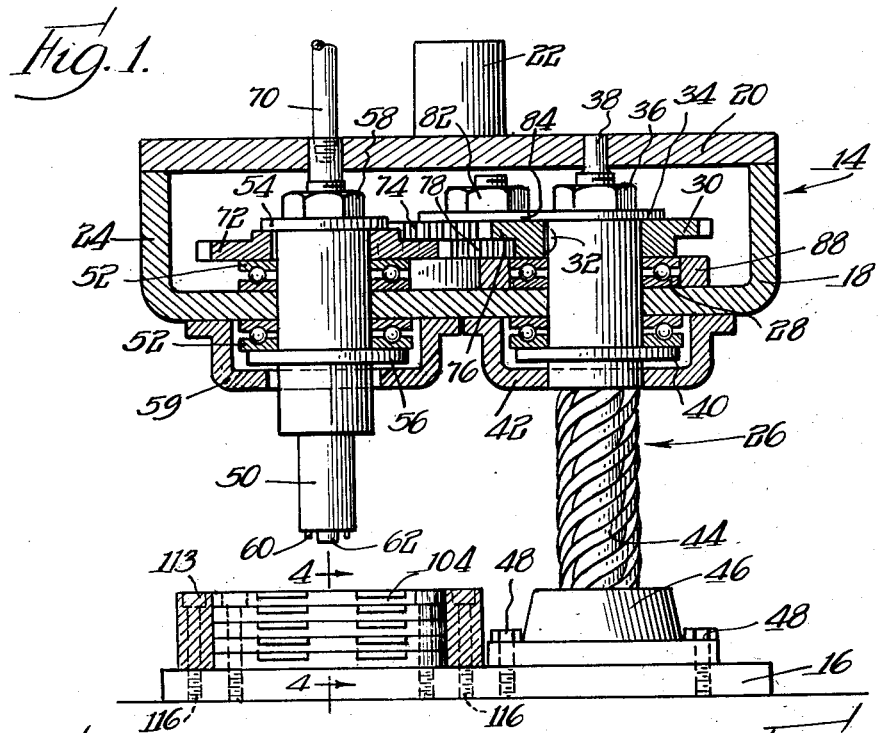
Fig. 2.
Fig. 3.
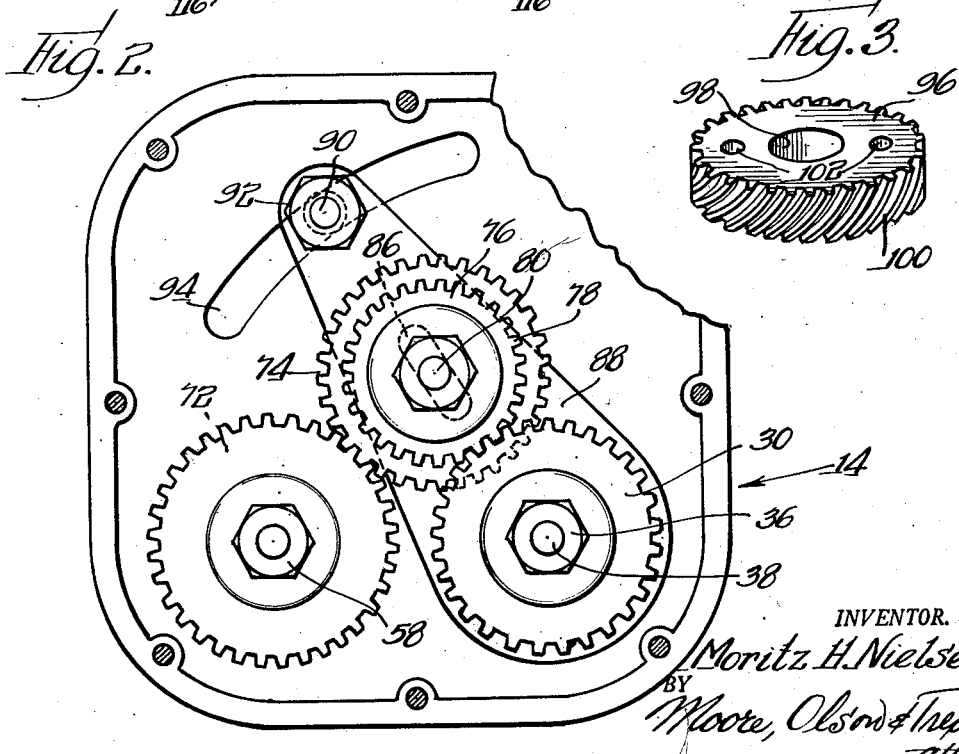
INVENTOR.
Moritz H. Nielsen
BY
Moore, Olson & Trexler
attys.

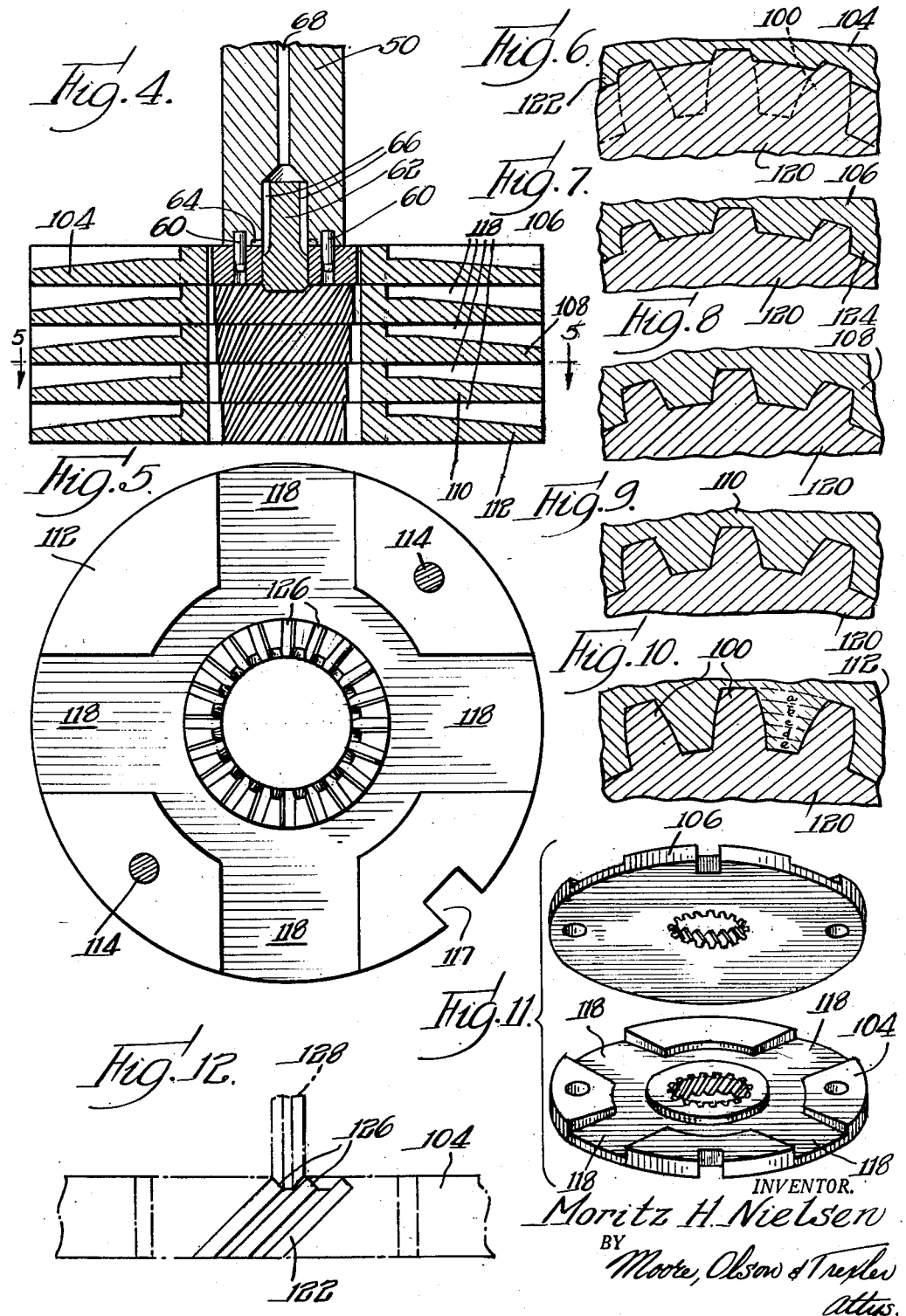

Patented Apr. 13, 1954

2,674,924

UNITED STATES PATENT OFFICE 2,674,924

DIE MECHANISM

Moritz H. Nielsen, Chicago, Ill., assignor to Illinois Tool Works, Chicago, Ill., a corporation of Illinois Application October 6, 1949, Serial No. 119,957

4 Claims. (Cl. 90—10)

This invention relates generally to means for and methods of cutting helical gear teeth, and more particularly to apparatus and methods whereby stock is removed from the periphery of gear blanks by means of a die mechanism through which the blanks may be forced.

Previous efforts to stamp gears from flat stock have often resulted in the production of imperfect gears. Frequently the teeth have been malformed and peripheral surface contours have not complied with the standards required for high grade machinery. This has been due in a large measure to the tendency for the peripheral portion of the blank to be pulled or drawn axially which causes some degree of tearing of the material. Helical gear teeth have been particularly susceptible to malformation, as there must be a relative twisting motion between the die and blank concurrent with the stamping.

An important object of this invention is to provide apparatus and methods whereby helical gear teeth may be formed on the periphery of blanks with great accuracy and with no surface disfiguration by a stamping operation.

To accomplish the foregoing objects, this invention contemplates the use of a stack of dies, each of which acts on a blank in succession to remove small increments of stock from the periphery of the blank. The invention further contemplates means for providing a relative twisting motion between the dies and blanks concurrently with the relative axial or stamping movement.

In the formation of helical gear teeth as outlined above, it is apparent that the relation between axial and rotational movement of the blank relative to the dies must be such as to move a peripheral point of the blank at a pitch equal to the pitch of the dies. If helical gear teeth of different pitches are to be formed by the same apparatus with a different set of dies, the rotational and axial movement relationship must also be altered to produce the proper pitch.

Among the important objects of this invention is the provision of means and methods for producing helical gear teeth of a variety of pitches by stamping operations with the same apparatus.

A more specific object of this invention is to provide an apparatus for stamping helical gear teeth from a blank in which the dies and the relative axial and rotative movement of the blank with respect to the dies may be altered to produce helical gear teeth of substantially any desired pitch.

The foregoing as well as other objects and advantages of this invention will be apparent from the following description when taken in conjunction with the accompanying drawings in which:

Fig. 1 is a front elevational view partially in section showing an embodiment of my invention;

Fig. 2 is a top view of the apparatus shown in Fig. 1 with the cover removed;

Fig. 3 is a perspective view of a finished helical gear;

Fig. 4 is a vertical sectional view taken substantially along the line 4—4 in Fig. 1 with the parts in different positions and a gear blank in contact with the first die;

Fig. 5 is a sectional view taken substantially along the line 5—5 in Fig. 4;

Figs. 6 to 10 inclusive are sectional views taken transversely of the die plates, Fig. 6 illustrating the uppermost die plate and Figs. 7 to 10 inclusive illustrating successive die plates positioned beneath the uppermost die plate;

Fig. 11 is a perspective view showing a pair of adjacent die plates which have been separated sufficiently to show adjacent surfaces; and Fig. 12 is a vertical sectional view taken along the axis of one of the die plates.

Referring to the drawings in greater detail, it will be seen that one embodiment of the present invention resides in apparatus or die mechanism generally designated by the numeral 14. This mechanism includes a lower fixed die base 16 and an upper reciprocal or punching mechanism 18. The mechanism 18 has an upper cover plate 20 which is secured to or formed integral with a reciprocating shaft 22 or the like in order to move the mechanism 18 up and down with a punching motion, or the mechanism may be moved in any other desirable manner. The cover plate 20 is secured by any suitable means such as screws to the top of a substantially cup-shaped rectangular housing 24. Located partially within and partially depending from the housing 24 is a lead screw 26. The upper portion of the lead screw is journaled in suitable axial thrust anti-friction bearings 28 and has a gear 30 secured to it above the upper bearing 28 by means of a key 32, a washer 34 and a nut 36. A shaft 38 may extend upward through the cover 20 from the upper end of the lead screw 26. A shoulder or collar 40 may be secured to the lead screw beneath and bearing against the lower bearing 28, and both this bearing and washer may be secured in a flanged cup-shaped casing 42 suitably secured to the underside of the casing 24. The depending portion 44 of the lead screw is provided with a peripheral helix which fits into a lead screw nut 46 suitably secured to the base 16 by means such as bolts 48.

A gear punch 50 is mounted parallel to and laterally displaced from the lead screw 26 in the casing or housing 24. The upper portion of the gear punch is secured within the housing 24 by means of anti-friction bearings 52, a washer 54, a shoulder or collar 56 similar to the shoulder 40, and a nut 58. The lower bearing 52 and the washer 56 are covered by a casing 59 similar to the casing 42 secured to the underside of the casing 24 by any desirable means. The lower end of the gear punch is provided with driving pins 60 and with a gear blank locating pin 62. The gear punch 50 is provided with a shallow axial aperture 64 about the locating pin 62 and of greater diameter than this pin. The locating pin is provided with air channels 66 communicating with an axial aperture 68 in the gear punch, which at its upper end is secured to an air hose 70 in order to strip a finished gear from the gear punch at the completion of a gear forming operation. A gear 72 is secured to the gear punch 50 within the housing 24 and meshes with the outer peripheral teeth 74 of a gear 76. Inner peripheral teeth 78 of the gear 76 mesh with the periphery teeth of the gear 30. The gear 76 is rotatably mounted on a vertical shaft 80 and may be secured thereto by a nut 82, washer 84 and a key which is not shown. The shaft 80 is adjustably secured by suitable means in a longitudinal slot 86 in an adjusting member 88. The adjusting member 88 is rotatably mounted coaxially with the lead screw 26 at one end of the member 88 and has its other end secured to a shaft 90 by means of a nut 92. The lower end of the shaft 90 cooperates with an arcuate slot 94 in the lower surface of the housing 24. It may be readily seen that by virtue of the slots 86 and 94 a gear 76 of different size and relative number of inner and outer peripheral teeth can be installed to vary the gear ratio and hence the relative rotative speed of the lead screw 26 and gear punch 50.

A finished helical gear 96 produced by my die mechanism is shown in Fig. 3 having an axial bore 98, peripheral helical teeth 100 and driving holes 102 parallel to the axis of the gear and cooperable with the driving pins 60. In order to produce this gear I have provided beneath the gear punch, a plurality of gear dies or sections 104, 106, 108, 110 and 112 nested on top of one another within a cylindrical fixture 113 secured to the base 16 by any suitable means such as bolts 116. Each of these dies is apertured as at 114 to secure the dies in stacked relation by bolts passing therethrough and a keyway 117 is provided on the periphery of each of the dies to secure them in proper alignment and to secure them to the fixture 113 to preclude rotation. Each of the dies is centrally apertured and is provided in its upper face with passageways 118 through which air may be blown by means which are not shown to discharge chips therethrough, it being understood that suitable apertures or conduits are provided in the cylindrical fixture 113. The axial aperture of each of the dies is provided with helical shaper teeth which are successively truncated, the upper die having the shortest shaper teeth. Downward movement of the punching mechanism 14 causes a gear blank which is secured at the lower end of the gear punch by the locating and driving pins 62 and 60, down against the side of the die 104 and through its central aperture, as may be seen in Fig. 6.

Axial and rotating movement of the blank 120 causes shaper teeth 122 to shave material from the outer periphery of the blank 120. The amount of stock removed or shaved off is indicated by the area in Fig. 10 indicated by the letter a. The dotted lines of Fig. 6 indicate the eventual shape of the teeth 100 as the punching operation is completed. As the blank moves downwardly past the die 104, it encounters the die 106 having shaper teeth 124 extending radially inward a greater distance than the shaper teeth 112 to shave off the material represented by the area marked b in Fig. 10. Successive downward and rotative movement of the blank past the dies 108, 110 and 112 shaves off successive increments of stock represented by the letters c, d and e in Fig. 10 to leave the finished teeth 100.

As may be seen in Figs. 5 and 11, the upper face of each die is provided with radial slots 126 extending outwardly a short distance from the central aperture to aid in removing chips and to insure a sharp edge in contact with the gear blank to give it a good finish. The slots 126, as are illustrated by Fig. 12, may be ground by a grinding wheel indicated at 128 and are shallowest at the periphery of the aperture and become deeper as they extend radially. The illustration in Fig. 12 has been labeled as the top die for purposes of identification, but the grinding of the slots 126 applies to all of the dies.

It will be apparent from the foregoing description that the die plates 104 to 112 inclusive not only shave successive increments of material from the periphery of a gear blank as it is moved downward and rotatively across them, but also serve to burnish or lap the previously punched surface areas to provide accurately and smoothly finished helical gear teeth. The teeth produced are as accurate as the shaper die teeth employed ot produce them and consequently any desired number of perfectly finished identical helical gears may be produced in a very short length of time compared with that required for hobbing. Additionally, this apparatus may be used with a different set of dies and different gears 30, 72 and 76 to produce helical gears having a different pitch. If the gear punch were to rotate at a constant speed relative to its downward movement, it is apparent that only one pitch could be obtained and the insertion of dies of a different pitch would result in jamming the apparatus. The lead screw 26 provides a rotative drive, the angular speed of which is constant relative to its downward speed, and the rotative speed of the gear punch 50 is readily changed relative to that the lead screw 26 by changing the gears 30, 72 and 76 which may have peripheral teeth 74 and 78 in any desired ratio. The slot 86 allows the gears 76 to be moved radially inwardly and outwardly relative to the gear 30 to compensate for the different diameters of the gears 30 and 76 encountered when changing the gears 30 and 76, and the gear 76 may be moved substantially radially of the gear 72 by virtue of the slot 92 to compensate for the changes in diameters attendant upon a change in the gears 72 and 76. The change in relative number of teeth 74 and 78 as well as changes in the diameters of gears 30 and 72 change the gear ratio as may be appreciated.

Gear blanks may be fed individually through the stacked dies by a stroke of the gear punch which is of sufficient length to drive the blank entirely through the series of dies. The finished gear is then disengaged from the punch by a blast of compressed air through the aperture 68 and channels 66. The fact that the die teeth in the lower or last die of the series are identical in size and shape with the space between the teeth of the finished gear, causes the teeth to be burnished and have practically perfect surfaces.

Although one specific form of my invention has been shown and described for purposes of disclosure, it is to be understood that this invention is not limited to this specific form but contemplates other structure such as falls within the spirit and scope of the appended claims.

I claim:

1. Die mechanism for producing gears having peripheral helical teeth comprising a series of annular female dies for accommodating a gear blank and the annular body portions of certain of said dies being recessed radially in the faces thereof to facilitate removal of shavings, each of said dies having a plurality of circumferentially spaced, helical, inwardly extending shaper teeth, the teeth of each succeeding die extending inwardly farther than those of the preceding one, driven means including a reciprocating punching member for producing relative axial movement between a gear blank at the end of said punching member and said dies to shave successive increments of material from a gear blank, driving means producing rotational movement proportional to the relative axial motion of said driven means and a gear blank, and means for transmitting rotational movement from said driving means to said punching member at a predetermined speed ratio to advance a gear blank with a pitch equal to the pitch of said dies.

2. Die mechanism for producing gears having peripheral helical teeth comprising a base supporting a series of annular female dies for accommodating a gear blank, each of said dies having a plurality of circumferentially spaced, helical, inwardly extending shaper teeth and the annular body portions of certain of said dies having radial slots between the teeth thereof to facilitate removal of shavings, the teeth of each succeeding die extending inwardly farther than those of the preceding one, driven means including a driven shaft for producing relative axial movement between a gear blank and said dies to shave successive increments of material from a gear blank, driving means including a drive shaft producing rotational movement proportional to the relative axial motion of said driven means and a gear blank, and means including a carrier shiftable about the axis of one of said shafts and adjustably supporting replaceable gears means for transmitting rotational movement from said driving shaft to said driven shaft at a predetermined speed ratio to advance a gear blank with a pitch equal to the pitch of said dies.

3. Die mechanism for producing gears having peripheral helical teeth, comprising a base, a series of annular female dies mounted on said base for accommodating a gear blank, each of said dies having a plurality of circumferentially spaced, helical, inwardly extending shaper teeth and the annular body portions of certain of said dies having slots between the teeth thereof communicating with radially outward recessed portions to facilitate removal of shavings, the teeth of each succeeding die extending inwardly farther than those of the preceding one to shave successive increments of material from a gear blank, reciprocating means for producing relative axial movement between said gear blank and said dies, a punching member on said reciprocating means and engaging a gear blank, driving means carried by said reciprocating means and producing rotational motion proportional to and in response to the motion of said reciprocating means relative to said base, and means including replaceable gear means for transmitting rotational motion from said driving means to said punching member at a predetermined speed ratio to advance a gear blank with a pitch equal to the pitch of said dies.

4. Die mechanism for producing gears having peripheral helical teeth comprising a base, a series of female dies mounted on said base for accommodating a gear blank, each of said dies having a plurality of circumferentially spaced, helical, inwardly extending shaper teeth, the teeth of each succeeding die extending inwardly farther than those of the preceding one to shave successive increments of material from a gear blank, reciprocating means including a housing reciprocable therewith, a punching member rotatably carried by said housing and engaging a gear blank for producing relative axial movement between a gear blank and said dies, a gear on said punching member and within said housing, driving means carried by said housing for producing rotational movement proportional to and in response to the relative axial motion of said driving means and said base, a gear on said driving means and within said housing, a transfer gear within said housing having two sets of teeth for transmitting rotational movement at a changed rate between said previously named gears, and means in said housing for mounting said transfer gear movably substantially radially of each of said first two gears to allow substitution of gears of different diameters to produce a predetermined speed ratio to advance a gear blank with a pitch equal to the pitch of said dies.

References Cited in the file of this patent

UNITED STATES PATENTS

| Number | Name | Date |
|--------|------|------|
| 493,897 | Robertson | Mar. 21, 1893 |
| 1,859,006 | Schaad | May 17, 1932 |
| 2,194,595 | Hart | Mar. 26, 1940 |
| 2,282,193 | Lambrix | May 5, 1942 |
| 2,304,185 | Lee | Dec. 8, 1942 |
| 2,360,337 | Gookin | Oct. 17, 1944 |